US012601402B2

(12) United States Patent
Ding et al.

(10) Patent No.: US 12,601,402 B2
(45) Date of Patent: Apr. 14, 2026

(54) SERVO REDUCER

(71) Applicant: Guangdong Ocean University, Zhanjiang (CN)

(72) Inventors: Hongyu Ding, Zhanjiang (CN); Yuezhu Mo, Zhanjiang (CN); Shuzhi Mo, Zhanjiang (CN); Wenjie Yang, Zhanjiang (CN); Yangzhi Chen, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/186,608

(22) Filed: Apr. 22, 2025

(65) Prior Publication Data

US 2025/0385572 A1 Dec. 18, 2025

(30) Foreign Application Priority Data

Jun. 17, 2024 (CN) .......................... 202421369263.5

(51) Int. Cl.
| | |
|---|---|
| *F16H 1/20* | (2006.01) |
| *F16H 57/021* | (2012.01) |
| *F16H 57/12* | (2006.01) |
| *F16H 57/02* | (2012.01) |

(52) U.S. Cl.
CPC .............. *F16H 57/12* (2013.01); *F16H 1/20* (2013.01); *F16H 57/021* (2013.01); *F16H 2057/02034* (2013.01); *F16H 2057/127* (2013.01)

(58) Field of Classification Search
CPC ... F16H 1/20; F16H 1/206; F16H 1/22; F16H 2057/02034; F16H 57/12; F16H 2057/0221; F16H 2057/126; F16H 2057/127
See application file for complete search history.

(56) References Cited

U.S. PATENT DOCUMENTS

| | | | | |
|---|---|---|---|---|
| 10,935,107 B2 * | 3/2021 | Chen | ....................... | H02K 7/108 |
| 11,460,105 B2 * | 10/2022 | Sakai | ....................... | F16H 61/32 |
| 11,976,709 B2 * | 5/2024 | Chen | ....................... | H02K 7/14 |

FOREIGN PATENT DOCUMENTS

| | | | | | |
|---|---|---|---|---|---|
| CN | 116652922 A | * | 8/2023 | ............. | B25J 9/103 |
| JP | H1151156 A | * | 2/1999 | ............. | F16H 57/12 |
| JP | 2020148323 A | * | 9/2020 | ........... | F16H 57/023 |
| WO | WO-2009118218 A1 | * | 10/2009 | ............. | F16H 57/12 |
| WO | WO-2018121694 A1 | * | 7/2018 | ................ | B25J 9/10 |
| WO | WO-2018121731 A1 | * | 7/2018 | ........... | B25J 9/0021 |
| WO | WO-2018121749 A1 | * | 7/2018 | ............. | H02K 7/116 |

* cited by examiner

*Primary Examiner* — Bobby Rushing, Jr.

(57) ABSTRACT

A servo reducer includes a motor gear connected to a driving motor, a support structure, a first-stage gear set, a first-stage shaft, a second-stage gear set, a second-stage shaft, a third-stage gear set, a third-stage shaft, and an output gear meshed with the third-stage gear set. The first-stage shaft, the second-stage shaft, and the third-stage shaft are mounted on the support structure. The first-stage gear set is mounted on the first-stage shaft and is meshed with the motor gear. The second-stage gear set is mounted on the second-stage shaft and is meshed with the first-stage gear set. The third-stage gear set is mounted on the third-stage shaft and is meshed with the second-stage gear set. When an external load exceeds an allowable limit of a gear strength, external load energy is converted into friction heat between the teeth and consumed, so no backlash is defined.

10 Claims, 5 Drawing Sheets

SERVO REDUCER

CROSS-REFERENCE TO RELATED APPLICATION

The present disclosure claims foreign priority to Chinese Patent Application No. CN202421369263.5, titled: SERVO REDUCER HAVING AUTOMATIC BACKLASH COMPENSATION FUNCTION, filed on Jun. 17, 2024 in the State Intellectual Property Office of China, and the entire contents of which is hereby incorporated by reference.

TECHNICAL FIELD

The present disclosure relates to a technical field of servos, and in particular to a servo reducer.

BACKGROUND

Servos are widely used in products such as quadruped robots, humanoid robots, and building block robots. A conventional servo commonly comprises a motor, a reducer, a box, a control board, a position encoder, a control software, etc. After long-term use, the conventional servo may experience problems such as gear wear and increased backlash, which affect its performance.

SUMMARY

A purpose of one embodiment of the present disclosure is to provide a servo reducer having an automatic backlash compensation function, which solves a technical problem that after long-term use, a gear transmission is affected by increased backlash between meshing gears. As a result, gears of the servo reducer always maintain precise meshing, ensuring performance of the servo reducer and thus extending service life of the servo reducer and solving at least one technical problem involved in the prior art.

To solve the technical problem, the present disclosure provides the servo reducer. The servo reducer comprises a motor gear, a support structure, a first-stage gear set, a first-stage shaft, a second-stage gear set, a second-stage shaft, a third-stage gear set, a third-stage shaft, and an output gear.

The motor gear is connected to a driving motor. The first-stage shaft, the second-stage shaft, and the third-stage shaft are mounted on the support structure. The first-stage gear set is mounted on the first-stage shaft and is meshed with the motor gear. The second-stage gear set is mounted on the second-stage shaft and is meshed with the first-stage gear set. The third-stage gear set is mounted on the third-stage shaft and is meshed with the second-stage gear set. The output gear is meshed with the third-stage gear set. The third-stage gear set comprises a third-stage plate gear, a third-stage shaft gear, a baffle ring, a clutch spring, and an adjusting spring.

The third-stage plate gear is meshed with the second-stage gear set. First teeth are disposed on a bottom portion of the third-stage plate gear. A tooth thickness the third-stage shaft gear extends in an axial direction of the third-stage shaft and defines a first taper angle. The third-stage shaft gear is engaged with the output gear. Second teeth are disposed on a top portion of the third-stage shaft gear. The second teeth are meshed with the first teeth in the axial direction of the third-stage shaft.

The baffle ring is sleeved and fixed on the third-stage shaft and located on one side of the third-stage plate gear away from the third-stage shaft gear. The clutch spring is sleeved on the third-stage shaft. A first end of the clutch spring is fixedly connected to the third-stage plate gear. A second end of the clutch spring is fixedly connected to the baffle ring to apply an elastic force enabling the second teeth being meshed with the first teeth. The adjusting spring is sleeved on the third-stage shaft. A first end of the adjusting spring is connected to the baffle ring. A second end of the adjusting spring is connected to the support structure to apply an elastic force enabling the output gear being meshed with the third-stage shaft gear.

Optionally, the first-stage gear set is in clearance fit with the first-stage shaft, and the first-stage shaft is fixedly connected to the support structure.

Optionally, the second-stage gear set is in clearance fit with the second-stage shaft, and the second-stage shaft is fixedly connected to the support structure.

Optionally, the third-stage gear set is in clearance fit with the third-stage shaft, and the third-stage shaft is rotatably assembled to the support structure through a first bearing.

Optionally, the output gear is rotatably assembled to the support structure through a second bearing.

Optionally, the first taper angle of the third-stage shaft gear is 0.1-2°.

Optionally, the first teeth are in a wavy shape disposed in a circumferential direction of the third-stage shaft, the second teeth are in a wavy shape disposed in the circumferential direction of the third-stage shaft, and the first teeth are rotatable with respect to the second teeth.

Optionally, the servo reducer further comprises a housing. The support structure is fixed to the housing. The support structure comprises a first support layer, a second support layer, and a third support layer. The first support layer, the second support layer, and the third support layer are sequentially disposed at intervals from top to bottom. The first-stage shaft and the second-stage shaft are fixedly disposed on the second support layer. An upper end of the third-stage shaft is rotatably mounted on the first support layer. A lower end of the third-stage shaft is mounted on the second support layer.

Optionally, the servo reducer further comprises an output shaft. The output gear is fixedly disposed on the output shaft. An upper end of the output shaft is rotatably mounted on the first support layer. A lower end of the output shaft is rotatably mounted on the second support layer.

Optionally, a tooth thickness of the output gear extends in the axial direction of the output shaft. The output gear defines a second taper angle. A taper direction of the output shaft is opposite to a taper direction of the third-stage shaft gear.

The first teeth are meshed with the second teeth, so the third-stage gear is meshed with the third-stage shaft gear. Moreover, the clutch spring is provided. When an external load exceeds an allowable limit of a gear strength, the third-stage gear compresses the clutch spring, the first teeth and the second teeth rotate relatively, and energy of the external load is converted into friction heat energy between the first teeth and second teeth and is consumed. When the external load is reduced to be within an allowable range of the gear strength, the clutch spring axially compresses the third-stage gear, the first teeth is fixed with respect to second teeth, and the servo reducer works normally.

By providing the adjusting spring, in an initial use stage, the third-stage gear set moves axially under an action of the adjusting spring, and the third-stage shaft gear is meshed with the output gear without backlash. When the output gear and the third-stage shaft gear are worn in a thickness direction after a certain period of use, the third-stage gear set moves axially under the action of the adjusting spring, and the third-stage shaft gear is still meshed with the output gear without backlash. Therefore, in a life circle of the servo reducer, last-stage gears are always meshed with each other without backlash.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
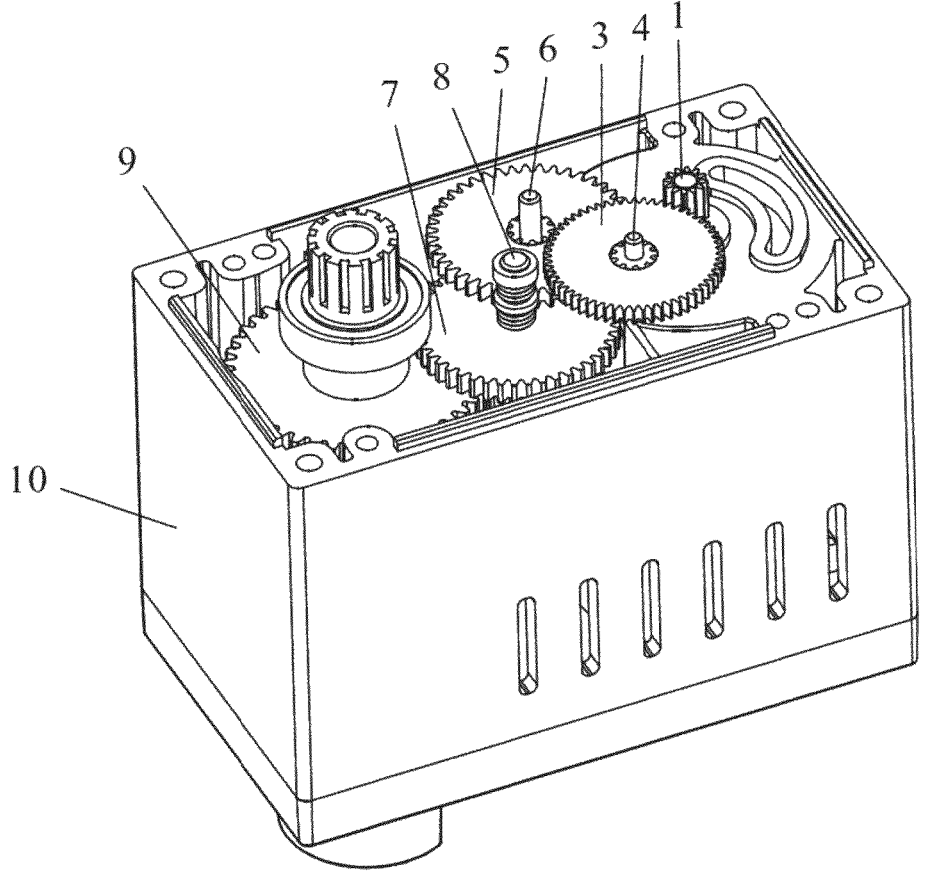
FIG. 1 is a perspective schematic diagram of a servo reducer having an automatic backlash compensation function according to one embodiment of the present disclosure.
Figure 2:
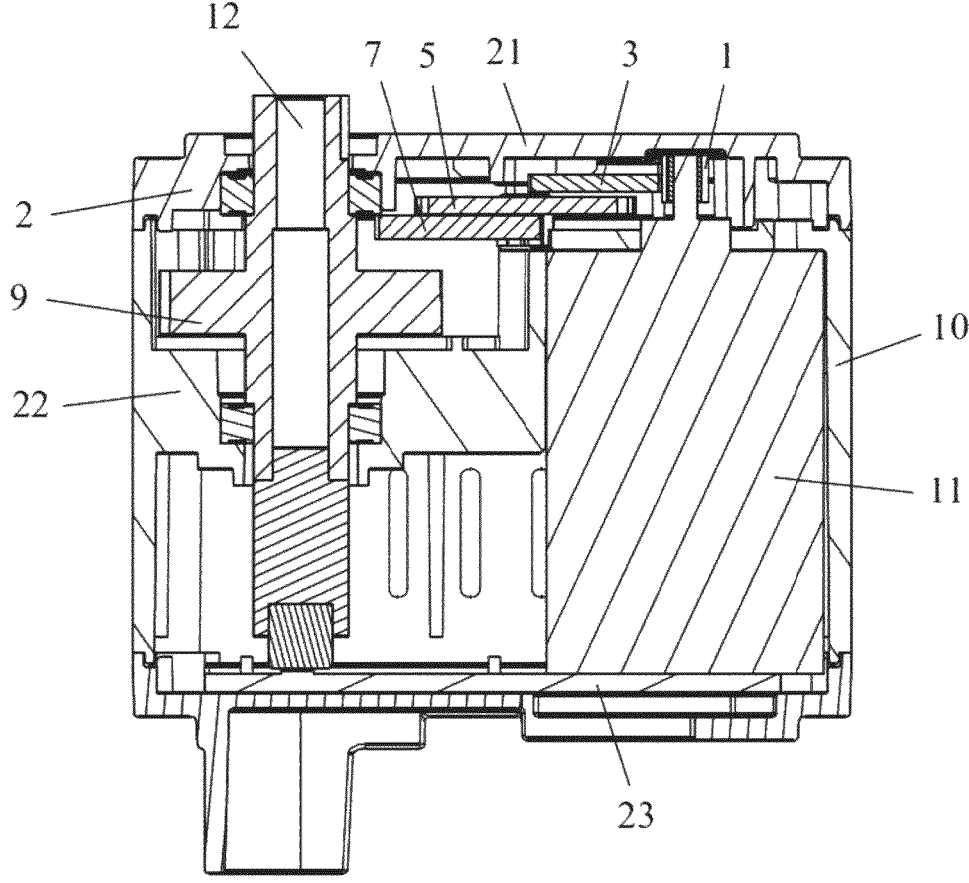
FIG. 2 is a cross-sectional schematic diagram of the servo reducer having the automatic backlash compensation function according to one embodiment of the present disclosure.
Figure 3:
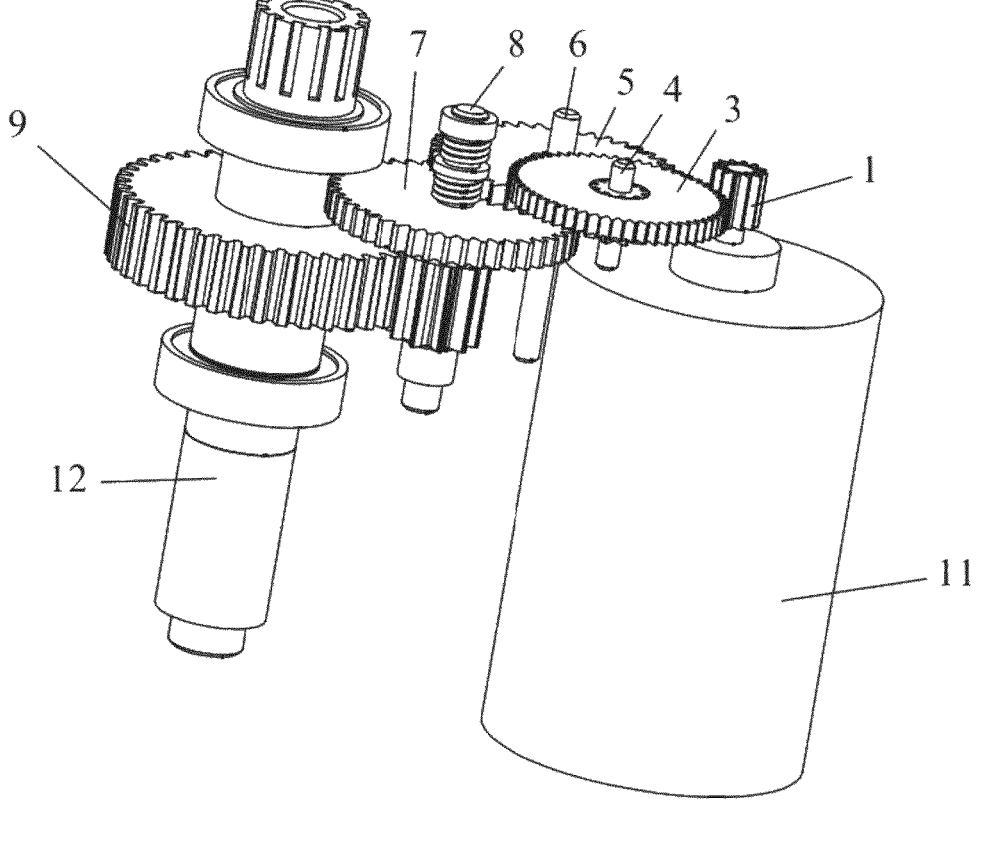
FIG. 3 is a partial schematic diagram of the servo reducer having the automatic backlash compensation function according to one embodiment of the present disclosure.
Figure 4:
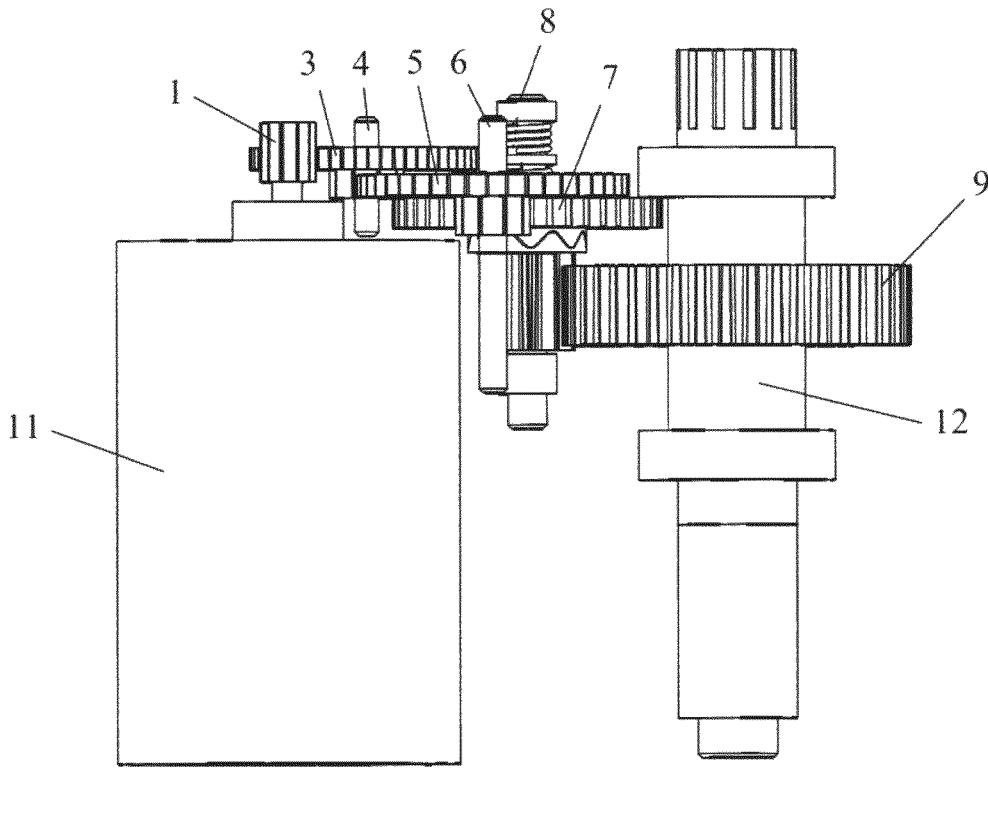
FIG. 4 is another partial schematic diagram of the servo reducer having the automatic backlash compensation function according to one embodiment of the present disclosure.

1—motor gear; 2—support structure; 21—first support layer; 22—second support layer; 23—third support layer; 3—first-stage gear set; 4—first-stage shaft; 5—second-stage gear set; 6—second-stage shaft; 7—third-stage gear set; 71—third-stage plate gear; 711—first tooth; 72—third-stage shaft gear; 721—second tooth; 73—baffle ring; 74—clutch spring; 75—adjusting spring; 8—third-stage shaft; 9—output gear; 10—housing; 11—driving motor; 12—output shaft.

DETAILED DESCRIPTION

Technical solutions in the embodiments of the present disclosure are clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

In the specification and claims of the present disclosure, terms "first", "second", etc. are intended to distinguish between similar objects, rather than describing a specific order or sequence. It should be understood that data used in this way may be interchanged under appropriate circumstances, so that the embodiments of the present disclosure can be implemented in an order other than those illustrated or described herein, and the objects distinguished by "first", "second", and etc. are generally objects of the same type, and the number of the objects is not limited. For example, both limitations of "first object" and "first objects" are proper. In addition, "and/or" in the specification and claims indicates at least one of the connected objects, and the character "/" generally indicates an alternative relationship between the associated objects.

The servo speed reducer having an automatic backlash compensation function of the present disclosure is described in detail below with reference to the accompanying drawings and specific embodiments and application scenarios thereof.

As shown in FIGS. 1-5, the present disclosure provides the servo reducer having the automatic backlash compensation function. The servo reducer comprises a motor gear 1, a support structure 2, a first-stage gear set 3, a first-stage shaft 4, a second-stage gear set 5, a second-stage shaft 6, a third-stage gear set 7, a third-stage shaft 8, an output gear 9, and a housing 10.

The motor gear 1 is fixedly connected to an output shaft of a driving motor 11.

The support structure 2 is fixed to the housing 10. The support structure 2 comprises a first support layer 21, a second support layer 22, and a third support layer 23. The first support layer 21, the second support layer 22, and the third support layer 23 are sequentially disposed at intervals from top to bottom.

As shown in FIGS. 1-4, the first-stage shaft 4 is fixedly disposed on the second support layer 22. The first-stage gear set 3 is mounted on the first-stage shaft 4 and is meshed with the motor gear 1. The first-stage gear set 3 is in clearance fit with the first-stage shaft 4.

The second-stage shaft 6 is fixedly disposed on the second support layer 22. The second-stage gear set 5 is mounted on the second-stage shaft 6 and is meshed with the first-stage gear set 3. The second-stage gear set 5 is in clearance fit with the second-stage shaft 6.

An upper end of the third-stage shaft 8 is rotatably mounted on the first support layer 21. A lower end of the third-stage shaft 8 is mounted on the second support layer 22. The third-stage gear set 7 is mounted on the third-stage shaft 8 and is meshed with the second-stage gear set 5. The third-stage gear set 7 is in clearance fit with the third-stage shaft 8. The third-stage shaft 8 is rotatably assembled to the support structure 2 through a first bearing.

The driving motor 11 is mounted and fixed on the third supporting layer 23.

It should be noted that, in some embodiments, the support structure 2 may be the housing 10 or a part of the housing 10.

The output gear 9 is meshed with the third-stage gear set 7. The output gear 9 is rotatably assembled to the support structure 2 through a bearing.

Figure 5:
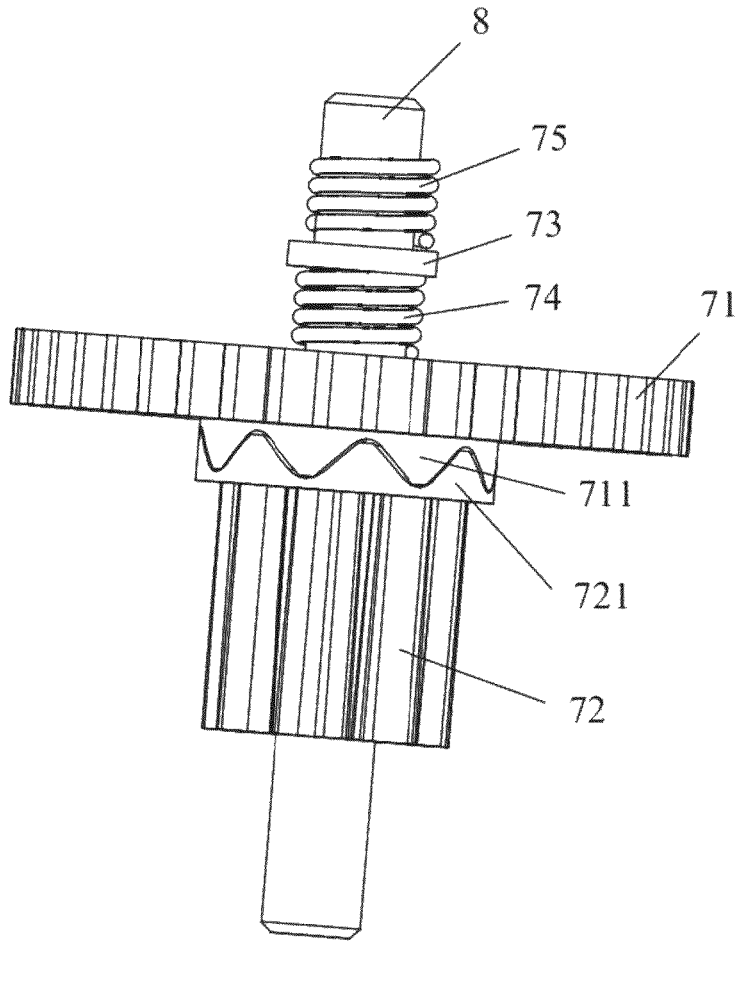
FIG. 5 is a schematic diagram of a third-stage gear set assembled with a third-stage shaft according to one embodiment of the present disclosure.

As shown in FIG. 5, the third-stage gear set 7 comprises a third-stage plate gear 71, a third-stage shaft gear 72, a baffle ring 73, a clutch spring 74, and an adjusting spring 75.

The third-stage plate gear 71 is meshed with the second-stage gear set 5. First teeth 711 are disposed on a bottom portion of the third-stage plate gear 71.

A tooth thickness the third-stage shaft gear 72 extends in an axial direction of the third-stage shaft 8 and defines a first taper angle. The third-stage shaft gear 72 is engaged with the output gear 9.

In some embodiments, the first taper angle of the third-stage shaft gear is 0.1-2°.

Second teeth 721 are disposed on a top portion of the third-stage shaft gear 72. The second teeth 721 are meshed with the first teeth 711 in the axial direction of the third-stage shaft 8.

In some embodiments, the first teeth 711 are in a wavy shape disposed in a circumferential direction of the third-stage shaft, the second teeth 721 are in a wavy shape disposed in the circumferential direction of the third-stage shaft, and the first teeth 711 are rotatable with respect to the second teeth 721.

The baffle ring 73 is sleeved and fixed on the third-stage shaft 8 and is located on one side of the third-stage plate gear 71 away from the third-stage shaft gear 72.

The clutch spring 74 is sleeved on the third-stage shaft 8. A first end of the clutch spring 74 is fixedly connected to the third-stage plate gear 71. A second end of the clutch spring 74 is fixedly connected to the baffle ring 73 to apply an elastic force enabling the second teeth 721 being meshed with the first teeth 711. In this way, when an external load exceeds an allowable limit of a gear strength, the third-stage gear compresses the clutch spring 74, the first teeth 711 and the second teeth 721 rotate relatively, and energy of the external load is converted into friction heat energy between the first teeth 711 and second teeth 721 and is consumed. When the external load is reduced to be within an allowable range of the gear strength, the clutch spring 74 axially compresses the third-stage gear, the first teeth 711 is fixed with respect to the second teeth 721, and the servo reducer works normally.

The adjusting spring 75 is sleeved on the third-stage shaft 8. A first end of the adjusting spring 75 is connected to the baffle ring 73. A second end of the adjusting spring 75 is connected to the support structure 2 to apply an elastic force enabling the output gear 9 being meshed with the third-stage shaft gear 72. In this way, when the output gear 9 and the third-stage shaft gear 72 are worn in a thickness direction after a certain period of use, the third-stage gear set 7 moves axially under the action of the adjusting spring 75, and the third-stage shaft gear is still meshed with the output gear 9 without backlash. Therefore, in a life circle of the servo reducer, last-stage gears are always meshed with each other without backlash.

The servo reducer further comprises an output shaft 12. The output gear 9 is fixedly disposed on the output shaft 12. An upper end of the output shaft 12 is rotatably mounted on the first support layer 21. A lower end of the output shaft 12 is rotatably mounted on the second support layer 22.

A tooth thickness of the output gear 9 extends in the axial direction of the output shaft. The output gear 9 defines a second taper angle. A taper direction of the output shaft 12 is opposite to a taper direction of the third-stage shaft gear 72.

It should be further noted that in order to achieve backlash-free meshing throughout the life cycle of the servo reducer, the adjusting spring 75 may be disposed on the first-stage gear set 3 and the second-stage gear set 5. Therefore, the first-stage gear set 3 is meshed the second-stage gear set 5 without backlash, and the second-stage gear set 5 is meshed with the tertiary gear set 7 without backlash throughout the life cycle of the servo reducer, The first teeth 711 are meshed with the second teeth 721, so the third-stage gear is meshed with the third-stage shaft gear. Moreover, the clutch spring 74 is provided. When an external load exceeds the allowable limit of the gear strength, the third-stage gear compresses the clutch spring 74, the first teeth 711 and the second teeth 721 rotate relatively, and energy of the external load is converted into friction heat energy between the first teeth 711 and second teeth 721 and is consumed. When the external load is reduced to be within the allowable range of the gear strength, the clutch spring 74 axially compresses the third-stage gear, the first teeth 711 is fixed with respect to the second teeth 721, and the servo reducer works normally.

By providing the adjusting spring 75, in the initial use stage, the third-stage gear set moves axially under the action of the adjusting spring 75, and the third-stage shaft gear is meshed with the output gear 9 without backlash. When the output gear 9 and the third-stage shaft gear are worn in the thickness direction after a certain period of use, the third-stage gear set moves axially under the action of the adjusting spring 75, and the third-stage shaft gear is still meshed with the output gear 9 without backlash. Therefore, in the life circle of the servo reducer, last-stage gears are always meshed with each other without backlash.

It should be noted that, in the present disclosure, terms "include", "have" or any other variants thereof are intended to cover non-exclusive inclusion, so that a process, method, article, or device including a series of elements includes not only those elements, but also other elements not explicitly listed, or further includes elements inherent to such process, method, article or device. In the absence of further restrictions, an element defined by the sentence "includes one . . . " does not exclude the existence of other identical elements in the process, method, article or device including the element.

In addition, it should be pointed out that a scope of the methods and systems in the embodiments of the present disclosure is not limited to performing functions in the order shown or discussed, and may further include performing functions in a substantially simultaneous manner or in reverse order according to the functions involved. For example, the described method may be performed in an order different from that described, and various steps may also be added, omitted, or combined. In addition, the features described with reference to certain examples may be combined in other examples.

The embodiments of the present disclosure are described above in conjunction with the accompanying drawings, but the present disclosure is not limited to the above-mentioned specific implementation methods. The above-mentioned specific implementation methods are merely illustrative and not restrictive. Under the guidance of the present disclosure, those skilled in the art may make many changes without departing from the purpose of the present disclosure and the protection scope of the claims, which should fall within the protection scope of the present disclosure.

What is claimed is:

1. A servo reducer, comprising:
a motor gear;
a support structure;
a first-stage gear set;
a first-stage shaft;
a second-stage gear set;
a second-stage shaft;
a third-stage gear set;
a third-stage shaft; and
an output gear;
wherein the motor gear is connected to a driving motor;
wherein the first-stage shaft, the second-stage shaft, and the third-stage shaft are mounted on the support structure, the first-stage gear set is mounted on the first-stage shaft and is meshed with the motor gear, the second-stage gear set is mounted on the second-stage shaft and is meshed with the first-stage gear set, the third-stage gear set is mounted on the third-stage shaft and is meshed with the second-stage gear set, and the output gear is meshed with the third-stage gear set;
wherein the third-stage gear set comprises a third-stage plate gear, a third-stage shaft gear, a baffle ring, a clutch spring, and an adjusting spring;

wherein the third-stage plate gear is meshed with the second-stage gear set, first teeth are disposed on a bottom portion of the third-stage plate gear, a tooth thickness the third-stage shaft gear extends in an axial direction of the third-stage shaft and defines a first taper angle, the third-stage shaft gear is engaged with the output gear, second teeth are disposed on a top portion of the third-stage shaft gear, and the second teeth are meshed with the first teeth in the axial direction of the third-stage shaft;

wherein the baffle ring is sleeved and fixed on the third-stage shaft and is located on one side of the third-stage plate gear away from the third-stage shaft gear, the clutch spring is sleeved on the third-stage shaft, a first end of the clutch spring is fixedly connected to the third-stage plate gear, a second end of the clutch spring is fixedly connected to the baffle ring to apply an elastic force enabling the second teeth being meshed with the first teeth, the adjusting spring is sleeved on the third-stage shaft, a first end of the adjusting spring is connected to the baffle ring, and a second end of the adjusting spring is connected to the support structure to apply an elastic force enabling the output gear being meshed with the third-stage shaft gear.

2. The servo reducer according to claim 1, wherein the first-stage gear set is in clearance fit with the first-stage shaft, and the first-stage shaft is fixedly connected to the support structure.

3. The servo reducer according to claim 1, wherein the second-stage gear set is in clearance fit with the second-stage shaft, and the second-stage shaft is fixedly connected to the support structure.

4. The servo reducer according to claim 1, wherein the third-stage gear set is in clearance fit with the third-stage shaft, and the third-stage shaft is rotatably assembled to the support structure through a first bearing.

5. The servo reducer according to claim 1, wherein the output gear is rotatably assembled to the support structure through a second bearing.

6. The servo reducer according to claim 1, wherein the first taper angle of the third-stage shaft gear is 0.1-2°.

7. The servo reducer according to claim 1, wherein the first teeth are in a wavy shape disposed in a circumferential direction of the third-stage shaft, the second teeth are in a wavy shape disposed in the circumferential direction of the third-stage shaft, and the first teeth are rotatable with respect to the second teeth.

8. The servo reducer according to claim 1, wherein the servo reducer further comprises a housing, the support structure is fixed to the housing, the support structure comprises a first support layer, a second support layer, and a third support layer, wherein the first support layer, the second support layer, and the third support layer are sequentially disposed at intervals from top to bottom, the first-stage shaft and the second-stage shaft are fixedly disposed on the second support layer, an upper end of the third-stage shaft is rotatably mounted on the first support layer, and a lower end of the third-stage shaft is mounted on the second support layer.

9. The servo reducer according to claim 8, wherein the servo reducer further comprises an output shaft, the output gear is fixedly disposed on the output shaft, an upper end of the output shaft is rotatably mounted on the first support layer, and a lower end of the output shaft is rotatably mounted on the second support layer.

10. The servo reducer according to claim 9, wherein a tooth thickness of the output gear extends in the axial direction of the output shaft, the output gear defines a second taper angle, and a taper direction of the output shaft is opposite to a taper direction of the third-stage shaft gear.

* * * * *